(12) United States Patent
Carullo et al.

(10) Patent No.: US 11,895,139 B2
(45) Date of Patent: Feb. 6, 2024

(54) METHOD FOR AUTOMATIC RETRIEVING AND MANAGING ASSETS INFORMATION IN A NETWORK

(71) Applicant: Nozomi Networks Sagl, Mendrisio (CH)

(72) Inventors: Moreno Carullo, Gavirate (IT); Andrea Carcano, San Francisco, CA (US)

(73) Assignee: Nozomi Networks Sagl, Mendrisio (CH)

( * ) Notice: Subject to any disclaimer, the term of this patent is extended or adjusted under 35 U.S.C. 154(b) by 294 days.

(21) Appl. No.: 17/481,363

(22) Filed: Sep. 22, 2021

(65) Prior Publication Data

US 2023/0089194 A1    Mar. 23, 2023

(51) Int. Cl.
*H04L 29/06* (2006.01)
*H04L 9/40* (2022.01)
*G06F 21/57* (2013.01)

(52) U.S. Cl.
CPC ........ *H04L 63/1433* (2013.01); *G06F 21/572* (2013.01); *H04L 63/1425* (2013.01)

(58) Field of Classification Search
None
See application file for complete search history.

(56) References Cited

U.S. PATENT DOCUMENTS

2022/0166789 A1* 5/2022 Murray ............... H04L 63/1416
2022/0210200 A1* 6/2022 Crabtree ............... G06F 16/951

* cited by examiner

*Primary Examiner* — Andrew J Steinle
(74) *Attorney, Agent, or Firm* — Jason Lee DeFrancesco

(57) ABSTRACT

Disclosed are methods for automatic retrieving and managing assets information in a network. The method includes identifying, defining, and valuing stored assets in a network. An asset is defined and identified by assigned values that include criticality values, resiliency values, granularity values, and freshness values that may be selected from a predefined set of values. The assets are valued by an overall quality score that is determined through computerized data processing and optimized by updating asset properties.

10 Claims, No Drawings

METHOD FOR AUTOMATIC RETRIEVING AND MANAGING ASSETS INFORMATION IN A NETWORK

FIELD OF INVENTION

The present invention relates to the field of network security, in particular it relates to the field of asset information management for cybersecurity. More in particular, the present invention relates to a method for automatic retrieving and managing assets information in a network.

BACKGROUND ART

In the cybersecurity field, with the term vulnerability is meant a weakness which can be exploited by a threat actor, such as an attacker, to cross privilege boundaries (i.e. perform unauthorized actions) within a computer system. To exploit a vulnerability, an attacker must have at least one applicable tool or technique that can connect to a system weakness.

Vulnerability management is the process of identifying such vulnerabilities in IT assets, which also comprises the steps of evaluating risks and taking appropriate actions. In particular, the vulnerability management process is of a cyclical kind, including the steps to discover all assets, prioritize assets, assess or perform a complete vulnerability scan, report on results, remediate vulnerabilities, verify remediation, to be repeated at predefined times. Vulnerability scanners are commonly used in vulnerability management to identify weaknesses across systems and networks, and play an integral role in the process.

Vulnerability management also comprises the evaluation of the risk as the potential of significant impact resulting from the exploit of a vulnerability. In fact, there are vulnerabilities without risk: for example, when the affected asset has no value. Therefore, a vulnerability with one or more known instances of working and fully implemented attacks is classified as an exploitable vulnerability, that is a vulnerability for which an exploit exists. If a risk is evaluated it comes together with the aforementioned vulnerability.

Vulnerabilities could affect software or hardware. The window of a vulnerability is the time from when the security hole was introduced or manifested in deployed software, to when access was removed, a security fix was available/deployed, or the attacker was disabled. There are vulnerabilities that are not related to software, such as hardware vulnerabilities, but the same aforementioned considerations apply.

Anyway, the impact of a security breach can be very high.

Therefore, the availability of correct, detailed and up-to-date information about assets in a network is a key piece for proper asset and vulnerability management and the primary goal of an asset information management system. The knowledge of the current firmware or operating system installed into an asset allows, for example, to have a complete picture of current and future vulnerabilities and to remediate possible bugs affecting processes and thus the business.

Modern, large-scale asset and vulnerability management practices need to rely on automated tools which integrate multiple sources of data to maximize coverage, detail and freshness of information, which amounts to a very huge number of information. There is, therefore, the need to ensure that accurate information, as well as high level of detail and freshness of the same, are generated to allow a prompt involvement to maximize management while, at the same time, to minimize any impact or risk associated with vulnerable or potentially vulnerable assets. Most important, the aforementioned goals should be achieved with the least possible computing effort.

BRIEF DESCRIPTION OF THE INVENTION

The object of the present invention is to provide a method capable to generate most accurate assets information with a reduced amount of pressure on the network.

According to the present invention is described, therefore, a method for automatic retrieving and managing assets information in a network.

The method for automatic retrieving and managing assets information in a network comprises:
- identifying, by a computerized data processing unit, one or more assets in the network;
- identifying, by the computerized data processing unit, all the asset properties and the related asset property values of each of the identified assets as listed in a predefined set of asset properties;
- storing, in a storage unit of the permanent type operatively connected to the data processing unit, the identified assets, the identified asset properties and the asset property values for the network;

wherein the method for automatic retrieving and managing assets information in a network further comprises, for each of the identified assets:
- assigning a criticality value from a predefined set of criticality values;
- assigning a resiliency value from a predefined set of resiliency values;
- assigning a granularity value to each of the identified asset properties from a predefined set of resiliency values;
- assigning a confidence value to each of the identified asset properties from a predefined set of confidence values;
- assigning a freshness value to each of the identified asset properties from a predefined set of freshness values;
- calculating, by the computerized data processing unit, the quality score of each of the asset properties as combination of the critical value, resiliency value, granularity value, confidence value and freshness value;
- calculating, by the computerized data processing unit, the overall quality score of the asset as sum of the quality score of the asset properties;

wherein the method for automatic retrieving and managing assets information in a network further comprises optimizing said quality score of at least one of the assets by updating one or more of the asset properties having a quality score below a predetermined quality score threshold, and wherein the updating is made by one or more direct requests and/or manual inspection of the assets.

In a further embodiment, the criticality value is a decimal number in the range between 0 and 1, wherein the value 0 expresses a low criticality while the value 1 expresses high criticality.

In a further embodiment, the resiliency value is a decimal number in the range between 0 and 1, wherein the value 0 expresses a low resiliency while the value 1 expresses high resiliency.

In a further embodiment, the granularity value is a decimal number in the range between 0 and 1, wherein the value 0 expresses a low granularity while the value 1 expresses high granularity.

In a further embodiment, the confidence value is a decimal number in the range between 0 and 1, wherein the value 0 expresses a low confidence while the value 1 expresses high confidence.

In a further embodiment, the freshness value is a decimal number in the range between 0 and 1, wherein the value 0 expresses a low freshness while the value 1 expresses high freshness.

In a further embodiment, the quality score of each of the asset properties is calculated as multiplication between the criticality value, the complementary of the resiliency value, the granularity value, the confidence value and the freshness value.

In a further embodiment, the optimizing follows an iterative procedure to define the requests of the deep packet inspection up a predefined maximum number of requests, wherein at each iteration the iterative procedure comprises:
  selecting a number of the asset properties equal to the maximum number of requests, wherein the selected asset properties have the lower quality score;
  grouping the selected asset properties by the relating assets defining a number of groups of asset properties;
  iterating the selecting and the grouping with further asset properties until the number of groups of asset properties is equal to the predefined maximum number of requests;
  translating each of the group of asset properties in corresponding deep packet inspection requests.

In a further embodiment, at each of the iteration the calculating the quality score of each of the asset properties and the calculating the quality score of the asset are repeated.

In a further embodiment, the overall quality scores are compared between each of the iteration, and
wherein the predefined maximum number of requests is increased when the overall quality score decreases.

DETAILED DESCRIPTION OF THE INVENTION

The present invention relates to a method for automatic retrieving and managing assets information in a network. ISO 27001:201 Annex A.8.1, herewith incorporated by reference, describes the Asset Management and is about responsibility for assets, with the objective to identify information assets in scope for the management system and define appropriate protection responsibilities. It is an important part of the information security management system (ISMS).

The method according to the present invention finds a useful application in any kind of physical infrastructures or automation systems connected in a network, in particular in industrial automation systems, such as industrial processes for manufacturing production, industrial processes for power generation, infrastructures for distribution of fluids (water, oil and gas), infrastructures for the generation and/or transmission of electric power, infrastructures for transport management. Moreover, it finds useful application with all the technology environments, including Information Technology (IT), Operation Technology (OT) and Internet of Things (IoT).

The term "site" means, in the present invention, a physical location where a certain amount of network-reachable assets is located.

The term "asset" means, in the present invention, a physical or virtual network-enabled equipment that is physically connected inside the network of a site. An asset can be a computer, a tablet, a printer, or any other kind of device able to communicate in a TCP/IP or a like network.

The term "link" means, in the present invention, a model which represents a communication between two assets over the network with some protocol. An asset can communicate or have the possibility to communicate with other assets. If an asset can communicate with another asset, they have a common link, as above described. Computer networks can have several components in between assets and different equipment types (routers, firewalls, application firewalls, etc.) exist that can inhibit all or some protocols between two assets. For these reasons, a link needs to have a "from" and a "to" asset, and a protocol because it is not guaranteed that if an $asset_a$ can connect to an $asset_b$ with a protocol, the same can happen for said $asset_b$ to said $asset_a$. Representing a link is, also, useful because it is possible to create a reachability graph of an asset, that in turn can be used to understand how infections can spread over the network.

The term "network protocol" means, in the present invention, a system of rules between assets on a network, describing how the bytes composing the message to exchange should be structured for the assets to understand each other. Noteworthy examples of network protocols are TCP/IP, Modbus, BACnet.

The term "packet" means, in the present invention, a finite sequence of bytes that represents a message exchanged between assets on a network, in particular between two nodes. Each protocol defines a particular structure for the set of valid packets that could be exchanged, and it defines the rules that govern a sensible communication.

The term "deep packet inspection" or "DPI" means, in the present invention, a technique that consists in listening to the network traffic (sniffing) and inspecting the captured packets to derive properties of the network.

A distributed network may therefore connect a plurality of sites which, in turn, could be provided with one or more assets. The latter could create a network of interconnections through links, as well described above.

The method according to the present invention allows to identify the aforementioned assets and to define a continuous integration of multiple sources of the asset properties. In particular, scope of the present invention is to determine and forecast the health status of the network by calculating the quality score of the aforementioned assets.

Due to the nature of networking hardware and software, one or more vulnerabilities can affect the Assets.

The term "vulnerability" means, in the present invention, a potential security problem that a given hardware or software product (or combination thereof) can have at a given version(s). A given vulnerability can be exploited in several different manners, and one of those is via network with one or more protocols where these protocols are used to infect the asset in the first place or to spread the infection to more assets (the protocols for the first and latter can be different).

The term "infection" means, in the present invention, the occurrence of some malware inside a network, and particularly affecting one (or more) assets, usually due to some form of vulnerability.

The method according to the present invention allows to evaluate the actual network quality information, as well as its changes over time.

The method for automatic retrieving and managing assets information in a network according to the present invention comprises:
  identifying one or more assets in the network;

identifying all the asset properties and the related asset property values of each of the identified assets as listed in a predefined set of asset properties;

storing the identified assets, the identified asset properties and the asset property values for the network.

The method is preferably carried out by making use of one or more computerized data processing unit, such as to operate the identifying of the assets and of the related asset properties. Moreover, a storage unit of the permanent type could be operatively connected to the data processing unit, such as to operate the aforementioned storing.

An asset is a physical or virtual (for example a Virtual Machine) network-enabled equipment that is physically connected inside the network. An asset can be a computer, a tablet, a printer, or any other kind of device able to communicate in a TCP/IP or a like network. An asset can have one or more asset properties which describe the asset and characterize it in different ways.

Therefore, asset properties are pieces of information about the asset. For example, Firmware Version, Model, Vendor, Type, Location are all asset properties.

Thinking at assets as a table describing all the assets, each asset property represents a distinct column of such table. Each asset property can collect one or more raw values from various information sources, hold one current value which can be selected from the raw values or computed from those.

Asset properties are updated through one or more source of information. A source of information can be either spontaneous or on-demand. It is spontaneous when the data flows somehow in the network regardless of its consumption, and it is on-demand when it is collected only when necessary. In the first category fall the so called passive or Deep Packet Inspection (DPI) based collection of information, which come from the analysis of links between assets. In the second category there are two main approaches: the opportunity to ask assets directly an asset property (for example by actively querying one of its network services, for example an embedded web server) and the possibility to manually import the asset properties from other systems or upon manual inspection, the latter being a common practice to check the status of health of each asset regularly closely. Sources of information can have different ranks of trust: manual inspection is usually considered the one with higher trust, while DPI is usually considered to have the lowest one. When multiple values or pieces of information are available for an asset property, trust is a fundamental metric to consider on how to select and merge the final value of the property.

On-demands source of information can involve several different ways to contact the asset itself, namely by different protocols. The selection of the best protocol to use to perform the queries to the asset is a crucial piece because it can affect the granularity, confidence and impact on the asset itself. The idea is that a knowledgebase is required to map each asset vendor/model to the best protocol known to work with that kind of asset. A way to build such knowledgebase is to perform tests in laboratories and/or to get the information from the vendors.

The method for automatic retrieving and managing assets information in a network according to the present invention further comprises for each of the identified assets:
  assigning a criticality value from a predefined set of criticality values;
  assigning a resiliency value from a predefined set of resiliency values;
  assigning a granularity value to each of the identified asset properties from a predefined set of resiliency values;
  assigning a confidence value to each of the identified asset properties from a predefined set of confidence values;
  assigning a freshness value to each of the identified asset properties from a predefined set of freshness values.

With regard to criticality value and resiliency value, each asset has a criticality rank and a resiliency rank that are considered when prioritizing activities and selecting strategies to update related information.

In an embodiment, the criticality value is a decimal number in the range between 0 and 1, wherein the value 0 expresses a low criticality while the value 1 expresses high criticality. An asset with high criticality is more important than others with lower criticality as it plays a crucial role in the day-by-day well-functioning of the business. Consequently, a bad or unknown status of the asset is a source of risk to the business.

In an embodiment, the resiliency value is a decimal number in the range between 0 and 1, wherein the value 0 expresses a low resiliency while the value 1 expresses high resiliency. The focus is about resiliency to undesired input and requests, in the form of processing external requests or events with potential errors while continue operating the main function of the asset itself. Assets with low resiliency can be embedded assets which have been designed to operate in isolation or in strict relationship with a selected number of assets, have not been engineered with cybersecurity in mind and have not been stress tested with fuzzy testing before being sold or updated. Assets with high resiliency on the other side can process additional, external requests aside from the planned ones and are able to continue working properly even with incorrect input is used in such requests.

The Resiliency of a device could be estimated from tests in a laboratory provided with various OT/IoT/IT equipment to test and study, where it is possible to estimate the probability that a packet send actively to the asset will block it, requiring therefore some form of manual or hardware restart. In principle, assets which have never shown symptoms of low performance or problematic behavior will get a resiliency value of 1, while assets that have shown a variation in their primary function will have lower scores, 0 for example for those assets which are so resilient that they would probably stop if an unknown packet arrives. Values between 0 and 1 could be estimated, for example, as 1−P(block|random_packet) considering all the experiments done in the laboratory. The reason why the estimation is done offline and not in the customer's environment is to eliminate the possibility to affect the stability of a real, production environment.

Each of the raw values collect for each asset properties has a total of four pieces of information, i.e. the value itself (for example: "Model42"), the confidence level (which expresses the amount of confidence in the correctness of data), the granularity (for example a generic family of models instead of a more specific model) and a timestamp. The asset property also has overall granularity value, confidence value and timestamp value (which are set when the current value is set) and a freshness value. The freshness value can be recent or old, depending on the likelihood of change of the property itself. For example, as the vendor of an asset is very unlikely to change, even a value of a few weeks-old will be considered recent, while the firmware version will be considered old if not updated in the last couple of days as the likelihood of being changed is higher.

In an embodiment, the granularity value is a decimal number in the range between 0 and 1, wherein the value 0 expresses a low granularity while the value 1 expresses high granularity. For example, the granularity can have one of these values:

1: expresses maximum quality. The value is reserved when imported from external systems or set manually.
0.9: the value means that detailed information has been extracted (i.e., Modicon M340 BMX P34 2020.
0.7: the value means that a detailed, but still not complete (i.e., Modicon M340).
0.4: the value means that a family/generic value has been found, but is not detailed (i.e., Modicon).
0: when the value is not known.

In an embodiment, the confidence value is a decimal number in the range between 0 and 1, wherein the value 0 expresses a low confidence while the value 1 expresses high confidence. For example, the confidence can have one of these values:

1: maximum confidence. Reserved value for imported or manually set values.
0.9: high confidence. Value extracted "as is" with DPI from a packet.
0.7: good confidence. Value derived from at least two indicators. A constraint is that in the protocol analysis, it has been observed in all the cases that when these two indicators have the specific value triggering the device identification field assignment, there have been zero cases where such correlation can bring to other conclusions.
0.4: low confidence. Value derived with one indicator. A constraint is that in the protocol analysis, it has been observed in all the cases that when the indicator has the specific value it is having, there have been zero cases where such correlation can bring to other conclusions.
0 when the value is not known.

In an embodiment, the freshness value is a decimal number in the range between 0 and 1, wherein the value 0 expresses a low freshness while the value 1 expresses high freshness. The freshness value could be defined through a knowledge base, for example it could be defined according to predetermined values over criterions defined by the user.

The overall quality of the system expresses how much correct and detailed information is available overall. It is computed in two steps. The first step is to update the freshness of each asset property of each asset according to the asset property criterions. This first step guarantees that freshness is up to date.

After that, in a second step each asset property will get its own quality score.

In this regard, the method for automatic retrieving and managing assets information in a network according to the present invention further comprises for each of the identified assets:

calculating, by the computerized data processing unit, the quality score of each of the asset properties as combination of the critical value, resiliency value, granularity value, confidence value and freshness value;
calculating, by the computerized data processing unit, the overall quality score of the asset as sum of the quality score of the asset properties.

In an embodiment, the quality score of each of the asset properties is calculated as multiplication between the criticality value, the complementary of the resiliency value, the granularity value, the confidence value and the freshness value.

The overall quality score will increase with more granular, confident, and fresh data about critical and resilient assets. Scope of the present invention is also its optimization while reducing the stress on assets with low resiliency.

At any given point in time, the status of the system is given by the collection of asset properties, and all their values. There are two main forces driving the change of such status. The first force comprises the spontaneous source of information updating the asset properties, while the second force comprises the requests to on-demand sources of information. The former allows to update the system with no particular actions, while the latter need to be selected and scheduled to finally update the system.

In a computer network the entities evolve over time according to several kind of events, that consequently change the status of one or more involved entity. Therefore, the computer network evolving over time needs to keep its quality of information or increase it. In this regard, the method for automatic retrieving and managing assets information in a network, according to the present invention, further comprises optimizing the quality score of at least one of the assets by updating one or more of the asset properties having a quality score below a predetermined quality score threshold. The update is made by one or more direct requests and/or manual inspection of the assets.

In an embodiment, the optimizing follows an iterative procedure to define the requests of the deep packet inspection up a predefined maximum number of requests, wherein at each iteration the iterative procedure comprises:

selecting a number of the asset properties equal to the maximum number of requests, wherein the selected asset properties have the lower quality score;
grouping the selected asset properties by the relating assets defining a number of groups of asset properties;
iterating the selecting and the grouping with further asset properties until the number of groups of asset properties is equal to the predefined maximum number of requests;
translating each of the group of asset properties in corresponding deep packet inspection requests.

The iterative procedure has the goal to decide which requests to on-demand sources of information need to be performed to improve the overall quality score under the constraint that a maximum of "n" on-demand requests can be performed.

The constraint to stay into "n" requests per cycle goes in the direction to not stress network and assets too much to follow the goal to optimize the overall quality score.

In an embodiment, at each of the iteration the calculating the quality score of each of the asset properties and the calculating the quality score of the asset are repeated.

Furthermore, in an embodiment, the overall quality scores are compared between each of the iteration, and wherein the predefined maximum number of requests is increased when the overall quality score decreases. In fact, the system also computes a self-sanity check about this constraint "n", which is a user selectable configuration. By comparing the overall quality score after each iteration of the iterative procedure, if the number will be decreasing over time it will mean that "n" is not big enough to guarantee that asset properties with a strict requirement of freshness stay up to date. The system can suggest to the user to increase the number, or to just warn that the current is too low to guarantee the overall quality score to stay afloat.

Moreover, asset properties can be potentially updated by spontaneous sources of information but also by on-demand sources of information. The two sources are generally quite different when it comes to their nature since spontaneous sources of information often bring high amount of data with potentially lower granularity and confidence, while on-demand sources of information usually have higher granularity and confidence, but since their supply is constrained by the number of requests that can be done at any point in time, the amount of asset property values updated is limited compared to what happens with spontaneous sources of information.

To leverage the frequency of updates coming from spontaneous sources of information there is an optional optimization that the system can do. The user needs to enable such functionality as it is heuristics based and the overall quality of data can be potentially lower, depending on several factors. This optimization affects how the current value of an asset property is updated from its raw values:

when a spontaneous source of information has a new raw value for an asset property
        if there is a previous raw value coming from the same source of information, and this value is equal to the new one (so, there is no change)
        if there is a raw value coming from an on-demand source of information, with higher granularity and confidence
        then the current value, granularity and confidence of the asset property are set to the raw value coming from the on-demand source of information
        the time stamp is set to the value coming from the spontaneous source of information
    when an on-demand source of information has a new raw value, behavior is the same as when the optimization is disabled.

This approach allows to keep the highest granularity of information while keeping freshness high. There is a risk of stale data though, which can be mitigated by periodically updating values without the optimization enabled.

The method according to the present invention allows therefore to maximize the level of detail of information of each asset in a network, to maximize the accuracy of such information and to maximize the freshness of said information as well.

The invention claimed is:

1. A method for automatic retrieving and managing assets information in a network comprising:
    identifying, by a computerized data processing unit, one or more assets in said network;
    identifying, by said computerized data processing unit, all the asset properties and the related asset property values of each of said identified assets as listed in a predefined set of asset properties;
    storing, in a storage unit of the permanent type operatively connected to said data processing unit, said identified assets, said identified asset properties and said asset property values for said network;
wherein said method for automatic retrieving and managing assets information in a network further comprises, for each of said identified assets:
    assigning a criticality value from a predefined set of criticality values;
    assigning a resiliency value from a predefined set of resiliency values;
    assigning a granularity value to each of said identified asset properties from a predefined set of resiliency values;
    assigning a confidence value to each of said identified asset properties from a predefined set of confidence values;
    assigning a freshness value to each of said identified asset properties from a predefined set of freshness values;
    calculating, by said computerized data processing unit, the quality score of each of said asset properties as combination of said critical value, resiliency value, granularity value, confidence value and freshness value;
    calculating, by said computerized data processing unit, the overall quality score of said asset as sum of the quality score of said asset properties;
wherein said method for automatic retrieving and managing assets information in a network further comprises optimizing said quality score of at least one of said assets by updating one or more of said asset properties having a quality score below a predetermined quality score threshold, and wherein said updating is made by one or more direct requests and/or manual inspection of said assets.

2. The method for automatic retrieving and managing assets information in a network according to claim 1, wherein said criticality value is a decimal number in the range between 0 and 1, wherein said value 0 expresses a low criticality while said value 1 expresses high criticality.

3. The method for automatic retrieving and managing assets information in a network according to claim 1, wherein said resiliency value is a decimal number in the range between 0 and 1, wherein said value 0 expresses a low resiliency while said value 1 expresses high resiliency.

4. The method for automatic retrieving and managing assets information in a network according to claim 1, wherein said granularity value is a decimal number in the range between 0 and 1, wherein said value 0 expresses a low granularity while said value 1 expresses high granularity.

5. The method for automatic retrieving and managing assets information in a network according to claim 1, wherein said confidence value is a decimal number in the range between 0 and 1, wherein said value 0 expresses a low confidence while said value 1 expresses high confidence.

6. The method for automatic retrieving and managing assets information in a network according to claim 1, wherein said freshness value is a decimal number in the range between 0 and 1, wherein said value 0 expresses a low freshness while said value 1 expresses high freshness.

7. The method for automatic retrieving and managing assets information in a network according to claim 1, wherein said quality score of each of said asset properties is calculated as multiplication between said criticality value, the complementary of said resiliency value, said granularity value, said confidence value and said freshness value.

8. The method for automatic retrieving and managing assets information in a network according to claim 1, wherein said optimizing follows an iterative procedure to define the requests of said deep packet inspection up a predefined maximum number of requests, wherein at each iteration said iterative procedure comprises:
    selecting a number of said asset properties equal to said maximum number of requests, wherein said selected asset properties have the lower quality score;
    grouping said selected asset properties by the relating assets defining a number of groups of asset properties;
    iterating said selecting and said grouping with further asset properties until said number of groups of asset properties is equal to said predefined maximum number of requests;
    translating each of said group of asset properties in corresponding deep packet inspection requests.

9. The method for automatic retrieving and managing assets information in a network according to claim 8, wherein at each of said iteration said calculating the quality score of each of said asset properties and said calculating the quality score of said asset are repeated.

10. The method for automatic retrieving and managing assets information in a network according to claim 9, wherein said overall quality scores are compared between each of said iteration, and wherein said predefined maximum number of requests is increased when said overall quality score decreases.

\* \* \* \* \*